United States Patent
Peake et al.

(10) Patent No.: US 9,289,717 B2
(45) Date of Patent: Mar. 22, 2016

(54) AIR DRYING SYSTEM FOR OBOGS

(71) Applicant: Carleton Life Support Systems, Inc., Davenport, IA (US)

(72) Inventors: Steven C. Peake, Dubuque, IA (US); Timothy T. Raleigh, Long Grove, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 0 days.

(21) Appl. No.: 14/575,072

(22) Filed: Dec. 18, 2014

(65) Prior Publication Data

US 2015/0165370 A1    Jun. 18, 2015

Related U.S. Application Data

(60) Provisional application No. 61/917,778, filed on Dec. 18, 2013.

(51) Int. Cl.
| | | |
|---|---|---|
| *B01D 53/22* | (2006.01) | |
| *B01D 53/26* | (2006.01) | |
| *B01D 53/047* | (2006.01) | |

(52) U.S. Cl.
CPC ............ *B01D 53/229* (2013.01); *B01D 53/268* (2013.01); *B01D 53/047* (2013.01); *B01D 2053/224* (2013.01); *B01D 2256/12* (2013.01); *B01D 2257/102* (2013.01); *B01D 2257/80* (2013.01); *B01D 2259/402* (2013.01); *B01D 2259/4575* (2013.01)

(58) Field of Classification Search
CPC ............... B01D 53/229; B01D 53/047; B01D 2053/224; B01D 2256/12; B01D 2257/80; B01D 2257/102; B01D 2259/402; B01D 2259/4575

See application file for complete search history.

(56) References Cited

U.S. PATENT DOCUMENTS

| | | | | |
|---|---|---|---|---|
| 3,849,089 | A * | 11/1974 | Ritter | B01D 53/04 95/104 |
| 4,321,069 | A * | 3/1982 | Ritter | B01D 53/04 96/116 |
| 4,329,158 | A * | 5/1982 | Sircar | B01D 53/0462 95/130 |
| 4,467,999 | A * | 8/1984 | Ritter | B01D 53/04 251/5 |
| 4,651,728 | A | 3/1987 | Gupta et al. | |
| 4,698,075 | A * | 10/1987 | Dechene | B01D 53/0446 96/116 |
| 4,822,384 | A * | 4/1989 | Kato | B01D 53/0407 55/417 |

(Continued)

OTHER PUBLICATIONS

"Aircraft Oxygen Generation" United States Air Force Scientific Advisory Board Feb. 1, 2012, 258 pages <http://www.foia.af.mil/shared/media/document/AFD-120913-052.pdf>.*

*Primary Examiner* — Jason M Greene
*Assistant Examiner* — Anthony Shumate
(74) *Attorney, Agent, or Firm* — Woods Oviatt Gilman LLP; Katherine H. McGuire, Esq.

(57) ABSTRACT

An air drying system for OBOGS is provided. The system comprises a bypass valve having an opened state and a closed state. The bypass valve is in fluid communication with an air inlet providing pressurized air. A dryer unit is configured to produce dried air when the bypass valve is in the closed state. An OBOGS unit produces oxygen enriched air while a purge valve has an opened state and a closed state. When the bypass valve is its closed state, the purge valve is in its opened state thereby directing a portion of the dried air to the oxygen generating system unit and a portion of the dried air to the dryer unit. When the bypass valve is its open state the pressurized air passes directly to the OBOGS unit.

19 Claims, 1 Drawing Sheet

(56) References Cited

U.S. PATENT DOCUMENTS

| | | | |
|---|---|---|---|
| 4,880,443 A * | 11/1989 | Miller | B01D 53/04 95/127 |
| 4,896,514 A * | 1/1990 | Sugiyama | B01D 53/047 62/404 |
| 5,137,549 A * | 8/1992 | Stanford | B01D 53/047 95/117 |
| 5,154,737 A * | 10/1992 | Jenkins | B01D 53/0446 95/11 |
| 5,169,415 A | 12/1992 | Roettger et al. | |
| 5,263,477 A | 11/1993 | Crome | |
| 5,344,474 A * | 9/1994 | Null | B01D 53/047 55/344 |
| 5,806,323 A * | 9/1998 | Bevier | B01D 53/0415 261/DIG. 15 |
| 5,827,358 A * | 10/1998 | Kulish | B01D 53/0407 96/115 |
| 5,858,063 A | 1/1999 | Cao et al. | |
| 6,063,169 A | 5/2000 | Cramer et al. | |
| 6,409,807 B1 | 6/2002 | Hager et al. | |
| 6,669,758 B1 | 12/2003 | Hart et al. | |
| 6,955,710 B2 * | 10/2005 | Lessi | A62B 7/14 128/204.18 |
| 6,997,970 B2 | 2/2006 | Crome | |
| 7,036,521 B2 | 5/2006 | Hager | |
| 7,037,358 B2 * | 5/2006 | Babicki | B01D 53/0423 95/113 |
| 7,160,367 B2 * | 1/2007 | Babicki | B01D 53/0423 96/116 |
| 7,402,193 B2 * | 7/2008 | Bliss | B01D 53/0407 128/204.26 |
| 7,445,660 B2 | 11/2008 | Hart et al. | |
| 7,694,674 B2 | 4/2010 | Crome et al. | |
| 7,845,188 B2 * | 12/2010 | Brutscher | B64D 37/32 244/53 R |
| 7,914,479 B2 * | 3/2011 | Monzyk | A61M 1/32 205/633 |
| 8,671,940 B2 | 3/2014 | Allen et al. | |
| 8,683,996 B2 | 4/2014 | Allen et al. | |
| 8,904,669 B2 * | 12/2014 | Tichborne | B01D 53/265 34/104 |
| 8,985,474 B2 * | 3/2015 | MacCallum | B01D 53/22 236/44 A |
| 2002/0004157 A1 * | 1/2002 | Keefer | B01D 53/047 429/415 |
| 2002/0134246 A1 * | 9/2002 | Babicki | B01D 53/0423 96/125 |
| 2003/0205132 A1 * | 11/2003 | Lessi | A62B 7/14 95/96 |
| 2003/0233936 A1 | 12/2003 | Crome | |
| 2004/0134349 A1 * | 7/2004 | Murley | B01D 53/0454 95/96 |
| 2004/0211476 A1 | 10/2004 | Hager | |
| 2004/0261618 A1 * | 12/2004 | Babicki | B01D 53/0423 95/113 |
| 2005/0235659 A1 * | 10/2005 | Brutscher | B64D 37/32 62/93 |
| 2006/0062707 A1 | 3/2006 | Crome et al. | |
| 2006/0243133 A1 | 11/2006 | Hart et al. | |
| 2010/0024821 A1 | 2/2010 | Rittner et al. | |
| 2011/0184252 A1 | 7/2011 | Archer et al. | |
| 2011/0184253 A1 | 7/2011 | Archer et al. | |
| 2011/0247621 A1 * | 10/2011 | Richard | B01D 53/047 128/204.23 |
| 2014/0137744 A1 * | 5/2014 | Wilkinson | A61M 16/101 96/152 |
| 2015/0122814 A1 * | 5/2015 | Tichborne | B64D 37/32 220/88.3 |
| 2015/0196245 A1 | 7/2015 | Peake | |
| 2015/0209544 A1 * | 7/2015 | Morita | A61M 16/101 96/110 |
| 2015/0231551 A1 * | 8/2015 | Wilkinson | B01D 53/0446 128/203.14 |
| 2015/0290577 A1 * | 10/2015 | Hirai | C25B 1/04 96/122 |

* cited by examiner

AIR DRYING SYSTEM FOR OBOGS

CROSS-REFERENCE TO RELATED APPLICATIONS

This application claims the benefit of U.S. Patent Application No. 61/917,778 filed on Dec. 18, 2013.

BACKGROUND OF THE INVENTION

The present invention relates to an air drying system to be used in conjunction with an onboard oxygen generating system (OBOGS) of an aircraft, such as a military fighter plane. More particularly, the present invention relates to an air drying system having a hollow fiber membrane filter for use with a pressure swing adsorption (PSA) OBOGS system.

The air drying system takes compressed air to generate oxygen enriched air (OEA), with nitrogen enriched air (NEA) being generated as a waste gas. The source of compressed air can be bleed air from the aircraft engine or auxiliary power unit (APU), or can be from ambient or aircraft cabin air that is pressurized using a feed air compressor. In all cases, the compressed air contains a certain amount of water vapor/humidity. In one embodiment of the invention, prior to gas separation via the PSA molecular sieves, the air passes through a hollow fiber membrane (HFM) filter to extract the water vapor from the air. The HFM filter is then swept by either pre-PSA dried air or post-PSA NEA to dispel any collected water vapor to atmosphere thereby allowing for continual water extraction within the HFM filter unit.

To operate effectively, OBOGS units require a certain amount of pressure at the air inlet. Important to the present invention, the pressure drop across the HFM filter, along with the purge flow used to sweep the HFM filter, necessitates that a higher inlet air pressure be provided to the system. However, an aircraft, such as a fighter jet, may be subject to instances of low inlet pressures to the OBOGS unit. For instance, bleed air pressure from the engines may be low when the engines are at a low throttle setting. Fighter pilots may also incur instances of increased oxygen demand, such as when flying at high altitudes or when performing maneuvers which generate significant G-forces. In these low inlet pressure/high oxygen demand situations, an embodiment of the air drying system of the present invention includes a bypass valve to circumvent the HFM filter unit such that any air passing through the inlet passes directly through the molecular sieves of the PSA unit thereby maximizing production of OEA for delivery to the pilot. Any water adsorbed by the molecular sieve of the PSA unit will be subsequently desorbed by HFM filter dried air from the HFM filter once the low inlet pressure/high oxygen demand condition has been resolved and the inlet air first passes through the HFM filter of the dryer unit.

SUMMARY OF THE INVENTION

The present invention addresses the above needs by providing an integrated air drying system for OBOGS that contains both an air drying unit, preferably a hollow fiber membrane filter unit, and an onboard oxygen generation system, preferably comprising a pressure swing adsorption unit, in one system. A further embodiment of the present invention includes the provision of a bypass valve such that air from the air inlet can bypass the air drying unit upon system conditions or operational demands. A still further embodiment of the present invention includes the provision of a purge valve to regulate the flow of any purge gas being directed to the air drying unit of the system.

DETAILED DESCRIPTION

Figure 1:
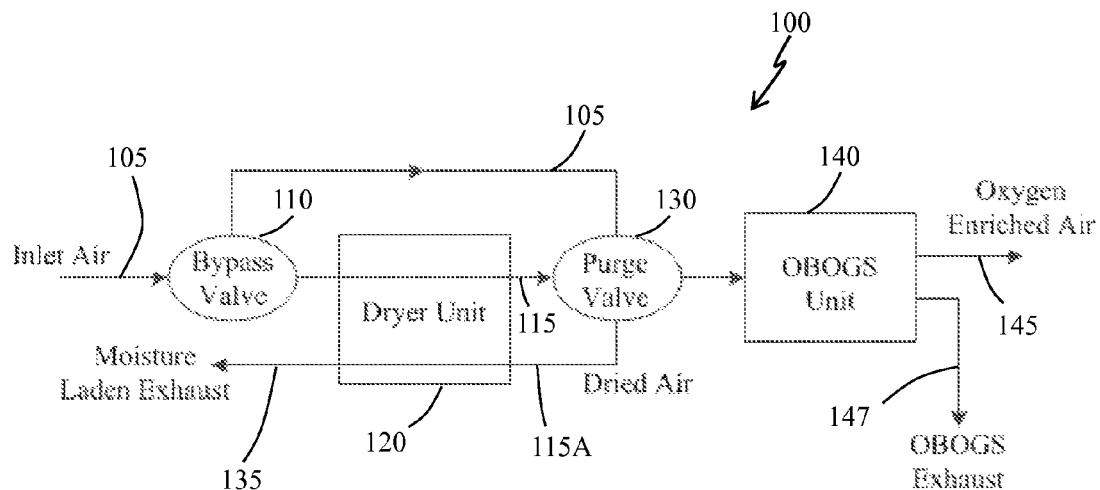
FIG. 1 is a schematic view of an embodiment of the invention having a purge valve located after the dryer unit but before the OBOGS unit.

A first embodiment 100 of an air drying system for use with an onboard oxygen generating system (OBOGS) unit of an aircraft in accordance with the present invention is shown in FIG. 1. Moist inlet air is generally provided to the air drying system as warm, pressurized bleed air from the aircraft's engines. Alternative sources of pressurized air supplied to the air inlet may include an auxiliary power unit (APU) or ambient or aircraft cabin air that is pressurized by a feed air compressor. The inlet air may further be preconditioned before being passed to the air drying system of the present invention. For instance, the bleed air may first pass through one or more particle filters to remove any solid contaminants (e.g., dust, hydraulic fluid, or other engine fluids) in the air stream or may be temperature and/or pressure conditioned before entering the present air drying system. It is important that the inlet air be of sufficient pressure for proper operation of the OBOGS unit, particularly when using a pressure swing adsorption (PSA) system.

As shown generally in FIG. 1, pressurized inlet air 105 enters the air drying system 100 by passing through bypass valve 110. During normal, i.e. gas drying, operations, the bypass valve 110 is closed such that the inlet air 105 is directed to dryer unit 120 where water, either in liquid or vapor form, is removed from the air stream. Preferably dryer unit 120 comprises one or more hollow fiber membrane (HFM) filters or filter arrays. The HFM filter selectively allows water molecules to permeate through the membrane material while the remaining gases (e.g., nitrogen, oxygen, argon, $CO_2$) do not permeate the membrane but traverse the length of the dryer unit where they may be ultimately directed to the OBOGS unit 140. In an alternative embodiment, dryer unit 120 may be comprised of another suitable gas drying system/medium, such as a desiccant or a condenser and water trap assembly.

The dried air 115 exiting the dryer unit 120 is then directed into purge valve 130. To purge any water residing within the dryer unit 120, a portion of the dried air 115A is redirected back toward the dryer unit 120, preferably in countercurrent flow to the incoming inlet air. The remaining dried air proceeds to the OBOGS unit 140. In a preferred embodiment, about 5% to about 50%, and more preferably about 10% to about 30%, and most preferably about 15% to about 25%, of the dried air is redirected to the dryer unit 120. The preferred countercurrent flow of the dried air 115A within the dryer unit removes the water collected by the dryer unit and expels the moisture laden air 135 to the environment such that the dryer unit can continuously dry incoming moist inlet air 105. To that end, dryer unit 120 may be equipped with a humidity sensor which measures the vapor content within the dryer unit. The humidity sensor may be operatively coupled to the purge valve 130 so as to controllably regulate the extent of any opening or closing of the purge valve 130, thereby varying the amount of dried air 115A redirected back to the dryer unit. In this manner, only that amount of dried air needed to purge the dryer unit is redirected to the dryer unit while the remainder passes to OBOGS unit 140. As such the amount of the dried air entering the OBOGS unit 140 is maximized while also maintaining the drying efficiencies of the dryer unit 120. However, as a portion of the dried inlet air is redirected to the dryer unit 120 before passing through the OBOGS unit 140, the inlet air pressure must be sufficiently high to accommodate this resulting pressure drop for proper OBOGS operation.

As stated above, the dried air 115 not redirected by purge valve 130 to the dryer unit 120 passes into the onboard oxygen generating system (OBOGS) unit 140. In a preferred embodiment of the present invention, OBOGS unit 140 comprises a pressure swing adsorption (PSA) system. In preferred embodiments, the PSA system includes a two-bed molecular sieve unit that continuously produces an enriched supply of oxygen. Each bed includes a molecular sieve comprised of a nitrogen adsorbent zeolite. In operation, one of the beds is fed the pressurized dried air 115 such that this air is selectively depleted of nitrogen (i.e. enriched with oxygen) by nitrogen adsorption to the zeolite material. The other of the two beds is no longer subjected to the pressurized dried air such that the previously adsorbed nitrogen desorbs from the zeolite at reduced pressure thereby regenerating nitrogen adsorbing active sites. In this manner, the dried air 115 is selectively cycled between the two beds of the PSA system such that one bed is continually producing oxygen enriched air (OEA) 145 while the other is desorbing nitrogen enriched air (NEA) 147. The OEA 145 is then either directed to an oxygen storage tank for holding until future use or is immediately directed to the pilot. The NEA 147 is exhausted to the external environment or may be diverted to a system for inerting void spaces in the aircraft. While shown and described as a PSA system, the OBOGS unit 140 may comprise alternative oxygen enriching systems, such as but not necessarily limited to vacuum pressure swing adsorption (VPSA) or oxygen selective membrane filter systems, and such systems should be considered within the scope of the present invention.

While the preceding description has been directed to normal operation (air drying prior to oxygen enrichment), there may be instances when the inlet air pressure is not sufficiently high enough to accommodate the pressure drop across of the HFM filter membrane or the loss of air pressure through the redirection of dried air 115A through the purge valve 130. There may be further instances of high oxygen demand such that the highest efficiency of oxygen generation by the OGOBS unit is required. In either of these scenarios, all of the inlet air will need to be directed to the OBOGS unit 140 without either first passing through the dryer unit 120 or having a portion of the inlet air redirected at the purge valve to purge the dryer unit of any moisture. Thus, in these low pressure/high demand instances, bypass valve 110 may be selectively positioned (opened), and the purge valve 130 may be closed, such that all of the inlet air 105 circumvents that dryer unit 120 and is instead directly injected into the OBOGS unit 140. To that end, bypass valve 110 may be a pressure controlled valve, either mechanical or electrical, which opens (i.e. directs inlet air directly to the OBOGS unit) when the inlet air is below a prescribed inlet pressure. In the case of an electrically actuated valve, a pressure transducer may feed an amplifier which feeds a comparator which opens or closes the bypass valve depending on the pressure.

While the bypass valve is open, the inlet air, along with any moisture present within the air, passes directly to the OBOGS unit 140. As a result, the zeolite material within the PSA system adsorbs water which in turn decreases nitrogen adsorption efficiency. However, when normal operations resumes and the bypass valve is closed such that the inlet air is directed through the dryer unit, the dried air 115 operates to desorb the water from the zeolite material in the PSA unit thereby regenerating optimal nitrogen adsorption efficiencies. In this manner, the present invention creates an air drying/oxygen generating system that performs at the highest possible efficiencies in low pressure conditions while also providing the maximum drying capability using the smallest possible dryer unit.

In a further embodiment, the bypass valve can operate to circumvent the dryer unit only when the inlet pressure is low, such as below about 10 psi, and the altitude is high, such as above 10,000 feet above sea level. In this manner, when the aircraft is at low throttle at altitudes lower than 10,000 feet, the bypass valve remains closed such that the inlet air passes through the dryer unit irrespective of the inlet pressure. When the plane is below 10,000 feet altitude, there is likely a much lower demand for oxygen than when flying at altitudes above 10,000 feet or when performing flight maneuvers that generate high G-forces. At the same time, the water vapor/humidity of the inlet air at low altitudes is likely higher than at high altitudes (warmer air at lower altitudes holds more water than higher altitude cold air) thereby indicating the need to dry such air prior to exposing any air to the zeolite materials within the OBOGS unit even though there is low or even insufficient inlet air pressure for maximum OBOGS PSA efficiency.

Figure 2:
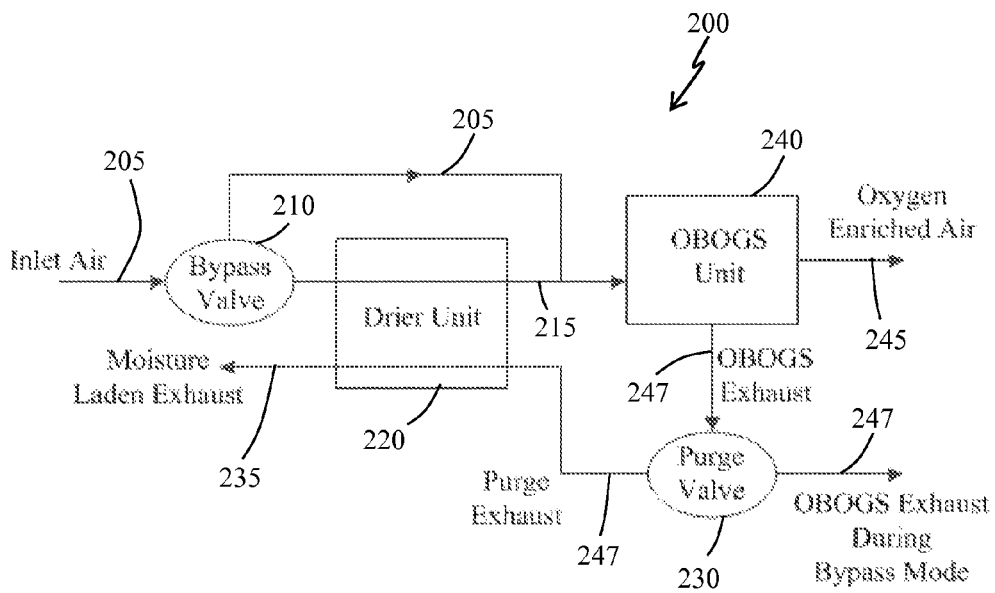
FIG. 2 is a schematic view of an alternate embodiment of the invention having a purge valve located after the OBOGS unit.

Turning now to FIG. 2, an alternative embodiment of an air drying system for OBOGS is generally indicated by reference numeral 200. Air drying system 200 comprises similar units to air drying system 100 described above, but such units are fluidly connected in an alternative arrangement. Similar to system 100, pressurized inlet air 205 is initially directed into a bypass valve 210. Under air drying conditions (i.e. sufficient inlet pressure and/or low oxygen demand), inlet air 205 passes through closed bypass valve 210 and enters dryer unit 220. Dryer unit 220, preferably comprised of an HFM filter or an array of filters, selectively extracts water from the feed air. However, unlike system 100, air drying system 200 has dried air 215 leaving the dryer unit 220 and passing directly into the OBOGS unit 240 without first passing through a purge valve. In this manner, all of the air (minus the water vapor) supplied at the air inlet is treated by the OBOGS unit 240. As such, production of OEA 245 is maximized while simultaneously minimizing the pressure drop across the system. That is, none of the dried air is redirected to the dryer unit 220 without first passing through the OBOGS unit 240. Rather, OBOGS exhaust 247 (i.e. NEA) passes through a purge valve 230. When open, purge valve 230 directs OBOGS exhaust 247 into the sweep section of dryer unit 220 wherein the OBOGS exhaust purges any moisture collected by the HFM filter by sweeping the water vapor from the dryer unit and exhausting the moisture laden exhaust 235 to the atmosphere.

When system 200 is subject to low pressure and/or high oxygen demand as similarly discussed above with regard to air drying system 100, bypass valve 210 opens thereby bypassing dryer unit 220 and passing inlet air 205 directly into the OBOGS unit 240. Preferably, purge valve 230 is simultaneously closed such that OBOGS exhaust 247 is exhausted directly to the atmosphere without being first redirected through dryer unit 220. In this manner, the system pressure drop is minimized which in turn maximizes the oxygen concentrating capability of the OBOGS unit. Again, once the low pressure/high oxygen demand situation is resolved, the bypass valve 210 closes such that inlet air 205 is directed into dryer unit 220. The dried air exiting dryer unit 220 and entering OBOGS unit 240 desorbs any moisture adsorbed onto the zeolite materials of the PSA system. Also, purge valve 230 opens such that the OBOGS exhaust 247 passes through the dryer unit 220 in (preferably) countercurrent flow so as to purge the dryer unit of any collected water. In this manner, oxygen generation efficiency is maximized when required while also providing for optimal moisture control in all situations.

Although the invention has been described with reference to preferred embodiments thereof, it is understood that various modifications may be made thereto without departing from the full spirit and scope of the invention as defined by the claims which follow.

What is claimed is:

1. An air drying system for OBOGS comprising:
   a. a bypass valve having an opened state and a closed state, the bypass valve being in fluid communication with an air inlet providing pressurized air;
   b. a dryer unit configured to produce dried air when said bypass valve is in the closed state;
   c. an OBOGS unit to produce oxygen enriched air; and
   d. a purge valve having an opened state and a closed state, wherein when said bypass valve is its closed state, the purge valve is in its opened state thereby directing a portion of the dried air to the oxygen generating system unit and a portion of the dried air to the dryer unit, and wherein when said bypass valve is its open state the pressurized air passes directly to the OBOGS unit.

2. The air drying system of claim 1 wherein the dryer unit comprises one or more water permeable hollow fiber membrane filters.

3. The air drying system of claim 1 wherein the OBOGS unit comprises a two-bed molecular sieve pressure swing adsorption assembly.

4. The air drying system of claim 1 wherein the portion of the dried air directed to the dryer unit is between about 10% and about 30% of the total amount of dried air.

5. The air drying system of claim 1 wherein the bypass valve is an electronically actuated valve.

6. The air drying system of claim 1 wherein the bypass valve is in the open state when said pressurized air is below a specified pressure limit.

7. The air drying system of claim 6 wherein said specified pressure limit is about 10 pounds per square inch.

8. The air drying system of claim 1 wherein the bypass valve is in the open state when said pressurized air is below a specified pressure limit and the when said air drying system is above a specified altitude.

9. The air drying system of claim 8 wherein said specified pressure limit is about 10 pounds per square inch and said specified altitude is about 10,000 feet above sea level.

10. An air drying system for OBOGS comprising:
    a. a bypass valve having an opened state and a closed state, the bypass valve being in fluid communication with an air inlet providing pressurized air;
    b. a dryer unit configured to produce dried air when said bypass valve is in the closed state;
    c. an OBOGS unit to produce oxygen enriched air and exhaust air; and
    d. a purge valve having an opened state and a closed state, wherein when said bypass valve is its closed state, the purge valve is in its opened state thereby directing the dried air to the dryer unit, and wherein when said bypass valve is its open state, the pressurized air passes directly to the OBOGS unit and the purge valve is in its closed state thereby directing the exhaust air to the environment.

11. The air drying system of claim 10 wherein the dryer unit comprises one or more water permeable hollow fiber membrane filters.

12. The air drying system of claim 10 wherein the OBOGS unit comprises a two-bed molecular sieve pressure swing adsorption assembly.

13. The air drying system of claim 10 wherein the portion of the dried air directed to the dryer unit is between about 10% and about 30% of the total amount of dried air.

14. The air drying system of claim 10 wherein the bypass valve is an electronically actuated valve.

15. The air drying system of claim 10 wherein the bypass valve is in the open state when said pressurized air is below a specified pressure limit.

16. The air drying system of claim 15 wherein said specified pressure limit is about 10 pounds per square inch.

17. The air drying system of claim 10 wherein the bypass valve is in the open state when said pressurized air is below a specified pressure limit and the when said air drying system is above a specified altitude.

18. The air drying system of claim 17 wherein said specified pressure limit is about 10 pounds per square inch and said specified altitude is about 10,000 feet above sea level.

19. An air drying system for OBOGS comprising:
    a. a bypass valve having an opened state and a closed state, the bypass valve being in fluid communication with an air inlet providing pressurized air;
    b. a dryer unit configured to produce dried air when said bypass valve is in the closed state;
    c. an OBOGS unit to produce oxygen enriched air; and
    d. a purge valve having an opened state and a closed state, wherein when said bypass valve is its closed state and the purge valve is in its opened state, at least a portion of the dried air is directed through the dryer unit, and wherein when said bypass valve is its open state the pressurized air bypasses the dryer unit and passes directly to the OBOGS unit.

* * * * *